United States Patent [19]
McCahon

[11] Patent Number: 5,653,663
[45] Date of Patent: Aug. 5, 1997

[54] ARM AND LEG POWERED CYCLE AND METHOD OF USE THEREOF

[76] Inventor: Forest B. McCahon, 1210 E. 16th Ave. #B, Anchorage, Ak. 99501

[21] Appl. No.: 586,986

[22] Filed: Jan. 16, 1996

[51] Int. Cl.[6] .......................... A63B 69/06; A63B 22/12
[52] U.S. Cl. ................. 482/62; 74/131; 280/245
[58] Field of Search .................. 482/57, 62–63, 482/52, 72; 74/130, 131, 132; 280/245, 246, 254, 258

[56] References Cited

U.S. PATENT DOCUMENTS

| | | | |
|---|---|---|---|
| 1,443,904 | 1/1923 | Parsons | 280/245 |
| 1,449,643 | 3/1923 | Wenderhold | 280/245 |
| 2,831,703 | 4/1958 | Shrimpton | 280/245 |
| 2,884,259 | 4/1959 | Snodgrass | 280/234 |
| 3,998,469 | 12/1976 | Ruys | 280/254 |
| 4,639,007 | 1/1987 | Lawrence | 482/57 |
| 4,842,269 | 6/1989 | Huang | 482/62 |
| 4,928,986 | 5/1990 | Carpenter | 280/234 |
| 5,236,211 | 8/1993 | Meguerditchian | 280/241 |
| 5,272,928 | 12/1993 | Young | 74/137 |
| 5,542,893 | 8/1996 | Peterson | 482/62 |

*Primary Examiner*—Stephen R. Crow
*Attorney, Agent, or Firm*—Michael J. Tavella

[57] ABSTRACT

A cycle that uses both arm and foot motions to drive it. Unlike other designs that connect the hand and foot movements to a single crank mechanism, the instant design uses two sets of gears that are stacked. Four straight toothed racks are positioned between the drive gears. The toothed racks are connected to the hand and foot levers so that as the levers are manipulated, the racks are moved back and forth. This reciprocating motion turns the gears, transferring energy to the main drive gear, which turns the wheels. The drive gears are paired so that one set is always providing power from each operating lever. The operating levers are designed to alternate—i.e., left hand forward left foot back at the same time as the right hand is back and the right foot is forward. Thus, with each stroke, power is transmitted to the wheels.

10 Claims, 8 Drawing Sheets

ARM AND LEG POWERED CYCLE AND METHOD OF USE THEREOF

This invention relates to arm and leg powered cycles and particularly to arm and leg powered cycles with multiple drive gears.

BACKGROUND OF THE INVENTION

The common bicycle has been around for about 100 years. During that time, numerous changes have been made to the basic design. The common bicycle has two tires and uses a pedal crank to turn a mounted sprocket. The sprocket drives a chain that is mounted to a transmission (typically another sprocket or series of sprockets) mounted on the rear tire. As the crank is turned, the rear wheel propels the bicycle forward. The rider's arms are typically supported by a set of handlebars that steer the bike. Although this design is popular and works well at a reasonable cost, it is limited in its efficiency and top speed. At best, the standard bicycle can operate at about 40 to 50 miles per hour. Such speeds can be maintained only by an expert rider in excellent physical condition. Even then, such speeds cannot be maintained indefinitely. Most riders can maintain speeds of 15–20 miles per hour. This level of exertion frequently causes the rider to perspire. As such, commuting by bicycle is not a popular option, especially if the commute is more than a few miles.

Overtime, different designs have been developed for bicycle type vehicles. Some of these vehicles have eliminated the sprocket and chain system for a toothed rack and gear system. Also, designs have been developed that use the rider's arms as well as his or her legs to drive the vehicle. The seating arrangements have also been modified to make riding more comfortable and to increase the available leverage. One example of this arrangement is the recumbent cycle, where the rider sits in a reclining position with the legs elevated.

Examples of these designs are found in the following U.S. Pat. No. 1,443,904 teaches a device that has a pivoting arm. The arm is attached to a toothed rack that engages a gear attached to the rear wheels. This vehicle is driven by the arms of the rider by pumping the pivoting arm back and forth. U.S. Pat. No. 1,449,643 shows a toy horse that uses a vertical toothed rack that engages a gear mounted on the rear wheels. The rider sits on a spring loaded seat that pushed down the rack. Foot rests are provided so that the rider can shift his or her weight forward, thereby allowing the seat and the rack to return to their upper positions. By shifting back and forth, the rider can then propel the vehicle forward. Another vehicle that uses a toothed rack is found in U.S. Pat. No. 2,831,703. This device has the rider standing on a pair of pedals that are attached to a pair of curved racks. The pedals are also connected to a pivot point so that as the rider moves his feet in a walking gait, the racks are pulled or pushed forward or back. The racks engage a gear system on the rear wheel that propels the vehicle forwards. Finally, U.S. Pat. No. 3,998,469 shows a bicycle that has a pair of pedals pivoting near the center of the rear wheel to curved vertical racks engage gears on the rear wheel to propel the vehicle. A variation on this system is seen in U.S. Pat. No. 5,236,211 that uses a series of cables to convert vertical motion of the feet into circular motion capable of propelling a vehicle. All of these devices use the legs to operate the vehicle.

Another line of bicycle-type vehicles embodies a structure that utilizes both the hands and the feet to operate the vehicles. This is done by some manner of alternate reciprocating mechanisms. Examples of these designs are found in following U.S. Pat. No. 2,884,259 is a device that uses a standard pedal crank and chain that are ties to a pair of hand levers. The operation drives a main gear that drives the vehicle. The hand levers are directly tied to the pedals with lengths of line. Although this produces some benefit, the operation is awkward and does not lend itself to a positive gain in mechanical advantage. U.S. Pat. No. 3,760,905 teaches a power converter that uses a recumbent design in which the operator sits in a reclining position. The feet operate a pair of pedals that move in a linear plane. The arms operate a pair of levers that reciprocate. According to the design of the invention, as the pedals and levers are manipulated, the gearing charges a number of springs that subsequently release their energy simultaneously into a drive shaft, thereby propelling the vehicle. Besides operating the device as a vehicle, the device can be used for exercise or to operate other machines.

U.S. Pat. No. 4,928,986 teaches a vehicle that uses both foot pedals and a plunger type handle bar for propulsion. The operating mechanism uses cables and chains to connect to a drive shaft that connects to a standard sprocket and chain to drive the rear wheel. The system requires the operator to push and pull the handlebar as well as push foot pedals to drive the vehicle. Since steering is done through the handlebar, this vehicle seems difficult to operate.

Finally, U.S. Pat. No. 5,272,928 teaches another recumbent cycle that has a pair of foot pedals and a single pivoting handlebar. This system also connects to a single chain and sprocket arrangement to drive the vehicle.

SUMMARY OF THE INVENTION

The instant invention is cycle that uses both arm and foot motions to drive it. Unlike other designs that connect the hand and foot movements to a single crank mechanism, the instant design uses three dual ratcheted drive gears that are stacked. Four straight linear gear toothed racks are positioned between the drive gears. The toothed racks are connected to the hand and foot levers so that as the levers are manipulated, the racks are moved back and forth. This back and forth motion turns the gears, transferring energy to the main drive gear, which turns the wheels. The drive gears are paired so that one set is provided for each operating lever. Moreover, the gearing is set to always power the main drive gear regardless of the direction of travel of the racks. The operating levers are designed to alternate—i.e., left hand forward left foot back at the same time as the right hand is back and the right foot is forward. Thus, with each stroke, power is transmitted to the wheels. As a result of this cumulative operation, great speeds, such as 40 miles per hour can be maintained for long periods of time without an excessive amount of exertion. This makes the device an excellent commuter vehicle or alternative vehicle to automobiles for short trips.

DETAILED DESCRIPTION OF THE INVENTION

Figure 1:
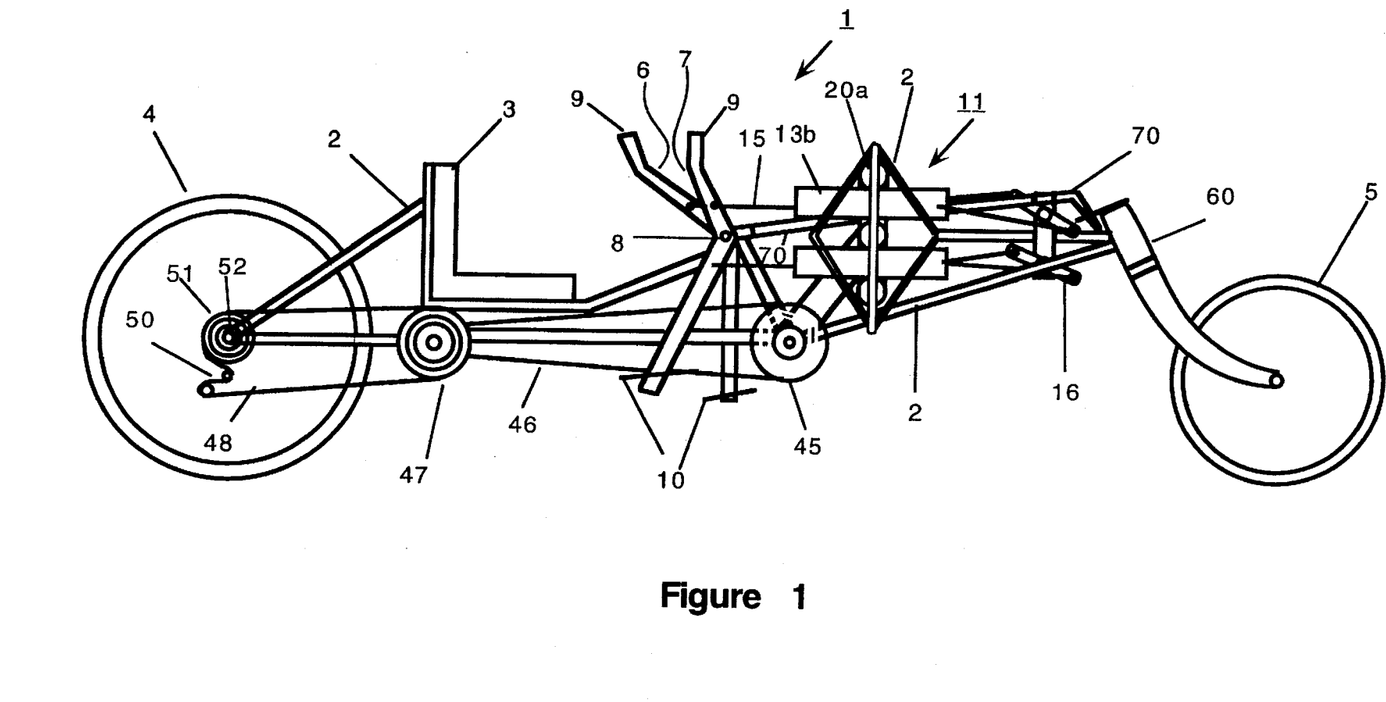
FIG. 1 is a side view of one embodiment of the invention.

Referring now to FIG. 1, the first embodiment of the cycle 1 is shown. In this embodiment, the cycle 1 has a frame 2 that supports the rider and the operating systems. The frame 2 is described in greater detail below. A seat 3 is attached to the rear of the frame 2 as shown. In this embodiment, the seat 3 is upright with respect to the frame 2. In the second embodiment (FIG. 2), the seat 3 is reclining, as in a recumbent style cycle. A drive wheel 4 is attached to the rear of the frame 2 as shown. A front wheel 5 is attached to the front forks 60. The frame 2 can be supported by one or two front wheels 5 and or one or two rear wheels 4. In the preferred embodiment, one front wheel 5 and one rear wheel 4 are used. The front wheel 5 is steerable using methods described below.

Two hand-foot levers 6 and 7 are attached to the frame 2 at pivot point 8. The hand-foot levers (or just levers) 6 and 7 are designed to pivot back and forth as the cycle 1 is operated. The levers 6 and 7 have a handle 9 at the top of the levers, as shown. The handles 9 are used to hold the levers 6 and 7 during operation of the cycle 1. Foot rests 10 are attached to the bottom of the levers 6 and 7 as shown. These are used to hold the rider's feet during operation of the cycle 1. The levers 6 and 7 are designed to pivot alternately as the cycle 1 is operated. Thus, the levers 6 and 7, as shown in FIG. 1, show the relative positions of the levers 6 and 7 at a point during the operation of the cycle 1.

Figure 2:
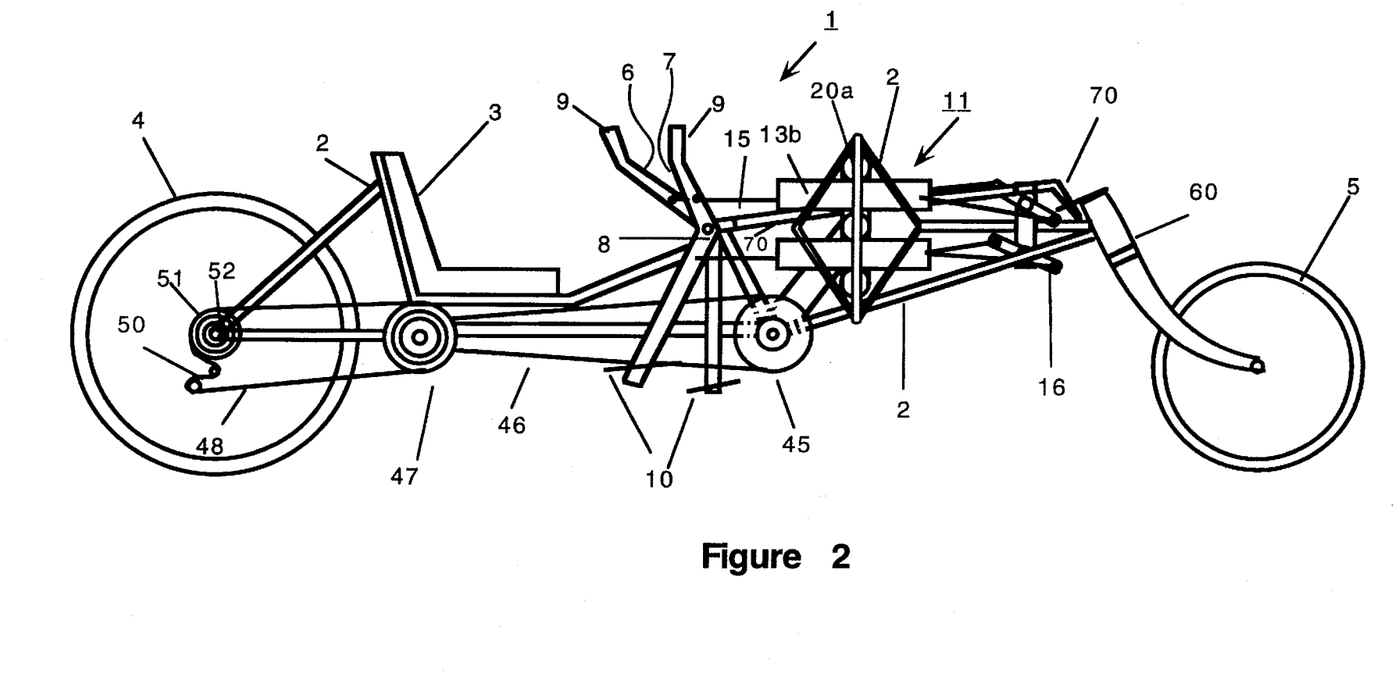
FIG. 2 is a side view of a second embodiment of the invention.

FIG. 2 shows the cycle 1 with the seat 2 in a reclined position. This position helps the rider operate the cycle 1 because the rider's feet and legs are in a better position to operate the levers 6 and 7. All other aspects of the invention are the same as shown in FIG. 1.

Figure 3:
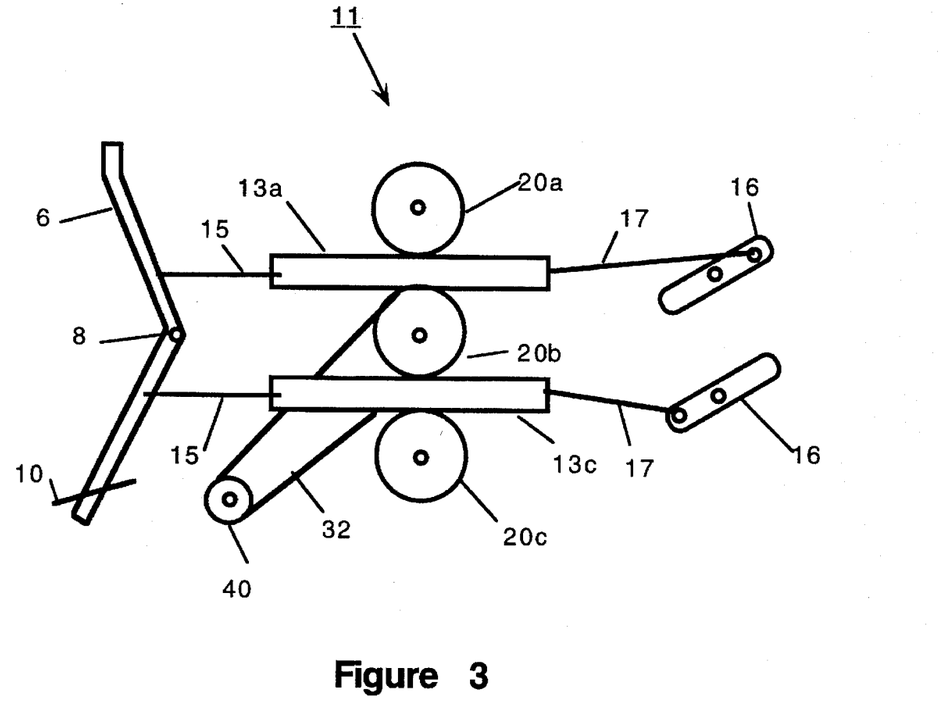
FIG. 3 is a side representational view of the operating mechanism.
Figure 3A:
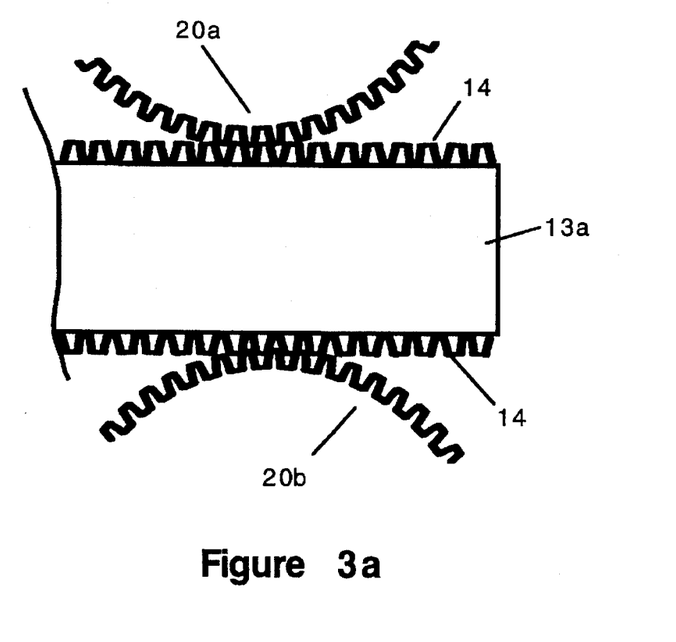
FIG. 3a is a detail view of a typical rack showing the placement of teeth.
Figure 4:
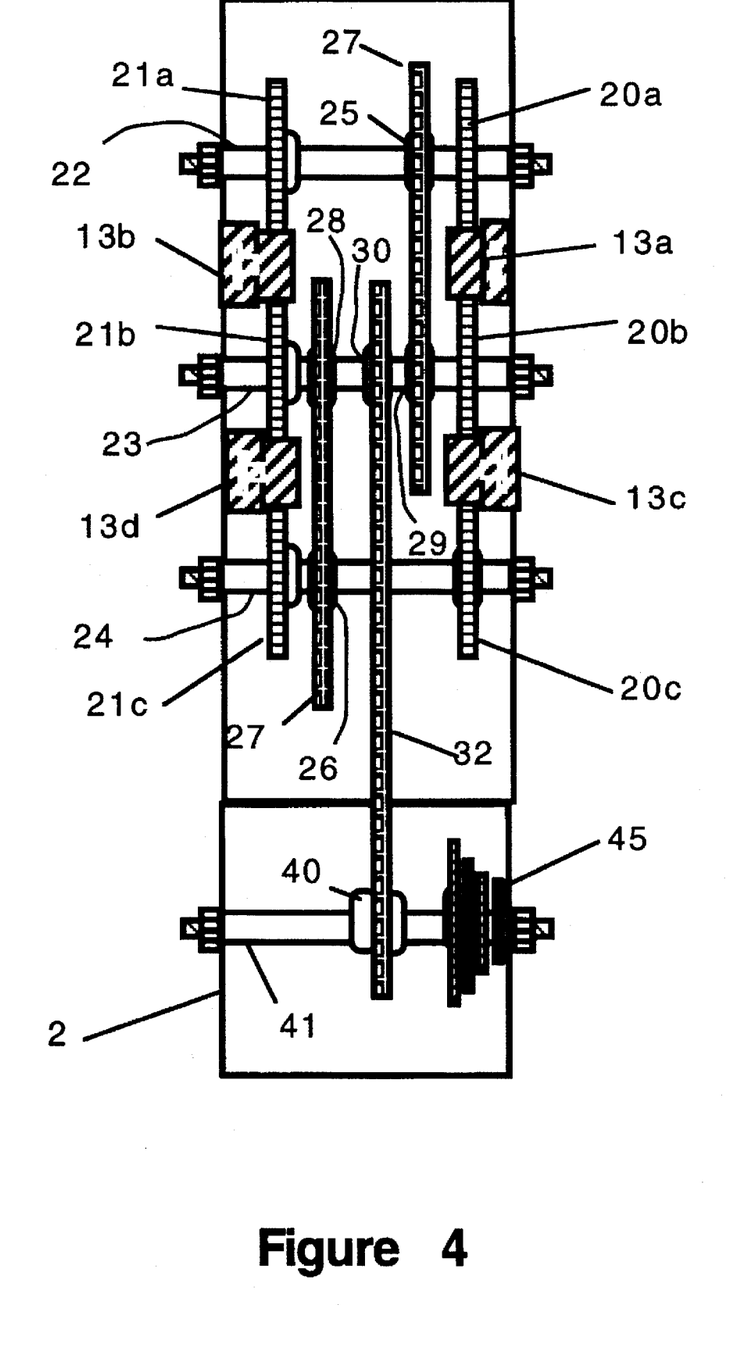
FIG. 4 is a front detail view of the operating mechanism.

The levers 6 and 7 are attached to the operating mechanism 11. The details refer to one operating mechanism 11, however, a second operating mechanism 11 that is identical to the first operating mechanism is provided on the opposite side of the cycle 1. Referring now to FIGS. 3 and 4, details of the first operating mechanism 11 are shown. Note that the frame components shown in FIGS. 1 and 2 are not shown for clarity. FIG. 3 is a side view of the essential elements of the operating system. The levers 6 and 7 (note only lever 6 is shown; the arrangement of parts is identical for lever 7) are connected to racks 13a, 13b. Racks 13c, and 13d are used in the second operating mechanism 11. Note that only racks 13a and 13c are shown in FIG. 3. All the racks 13a, 13b, 13c, and 13d are toothed bars that have teeth 14 on the top and bottom of the bar as shown in FIG. 3a. Push rods 15 attach the levers 6 and 7 to the racks 13a, 13b, 13c, and 13d. This allows the racks 13a, 13b, 13c, and 13d to move back and forth in a horizontal plane parallel to the frame 2. To produce a smooth reciprocating movement of the racks rotating arms 16 are attached to the ends of the racks 13a, 13b, 13c, and 13d by rods 17 as shown.

The teeth 14 on the racks engage three gears 20a, 20b and 20c, in the first operating mechanism 11, as shown. See also FIG. 3a. A corresponding set of gears 21a, 21b, and 21c is attached to the second set of racks as part of the second operating mechanism 11. See FIG. 4.

Referring now to FIG. 4, a front view of the operating mechanism 11 is shown. In this view, both sets of racks and gears are shown. Each set corresponds to one of the levers 6 or 7 as discussed above. The gears 20a, b, and c and 21a, b, and c, are placed on three common shafts: an upper shaft 22, a central shaft 23 and a lower shaft 24. On shafts 22 and 24, two chain drive sprockets 25 and 26 are placed as shown. Sprocket 25 is an upper transfer sprocket. Sprocket 26 is a lower transfer sprocket. These chain sprockets 25 and 26 are attached through chains 27, to a first center sprocket 28 and a second center sprocket 29, mounted on the central shaft 23 as shown. A third sprocket 30 is also attached to the center shaft 23. This sprocket attaches to a third chain 32 that connects to a drive sprocket 40, which is mounted to a drive shaft 41 that is rotatably attached to the frame 2. A set of drive gears 45 is attached to the drive shaft 41 also. The drive gears 45 attach to a chain 46 (see FIGS. 1 and 2) that engages a set of combination gears 47 also mounted on the frame 2 as shown in FIGS. 1 and 2. A fourth chain 48 then connects to a standard derailer 50 and a set of rear sprocket gears 51 on the rear drive shaft 52. This arrangement provides the rider with the ability to change gear speeds as desired. The rear drive shaft 52 then turns the drive wheel 4 to propel the vehicle.

Figure 5:
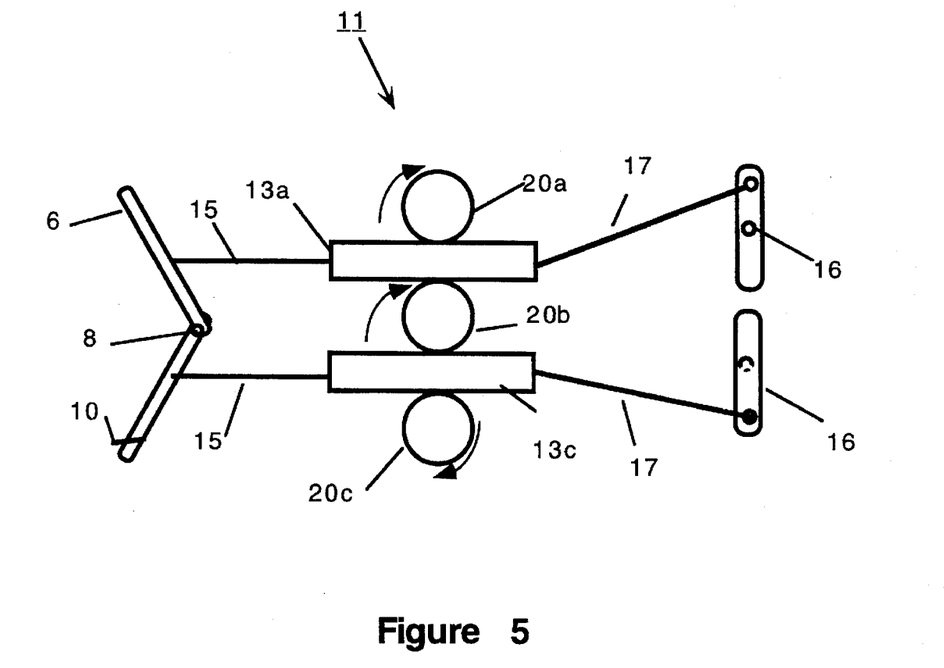
FIG. 5 is a side representational view of the operating mechanism in a first operating position.
Figure 6:
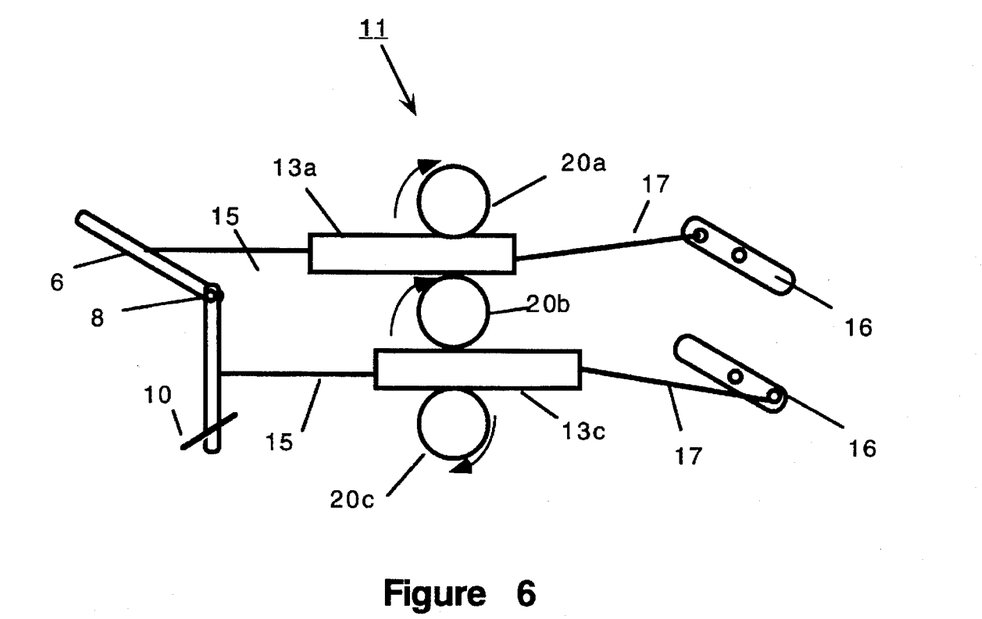
FIG. 6 is a side representational view of the operating mechanism in a second operating position.
Figure 7:
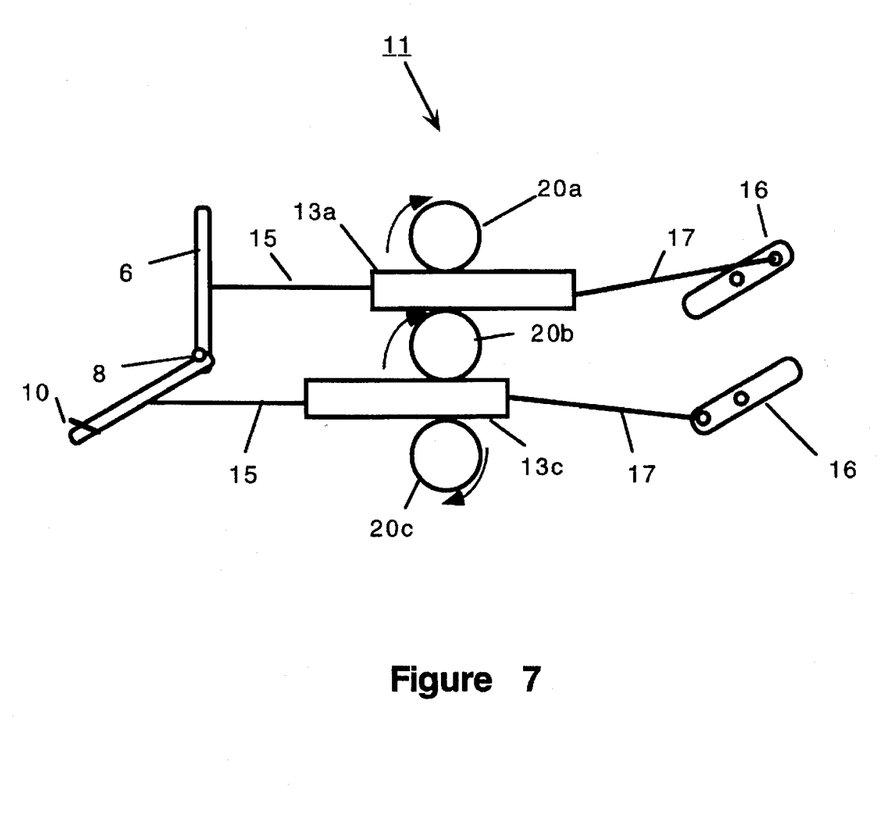
FIG. 7 is a side representational view of the operating mechanism in a third operating position.
Figure 8:
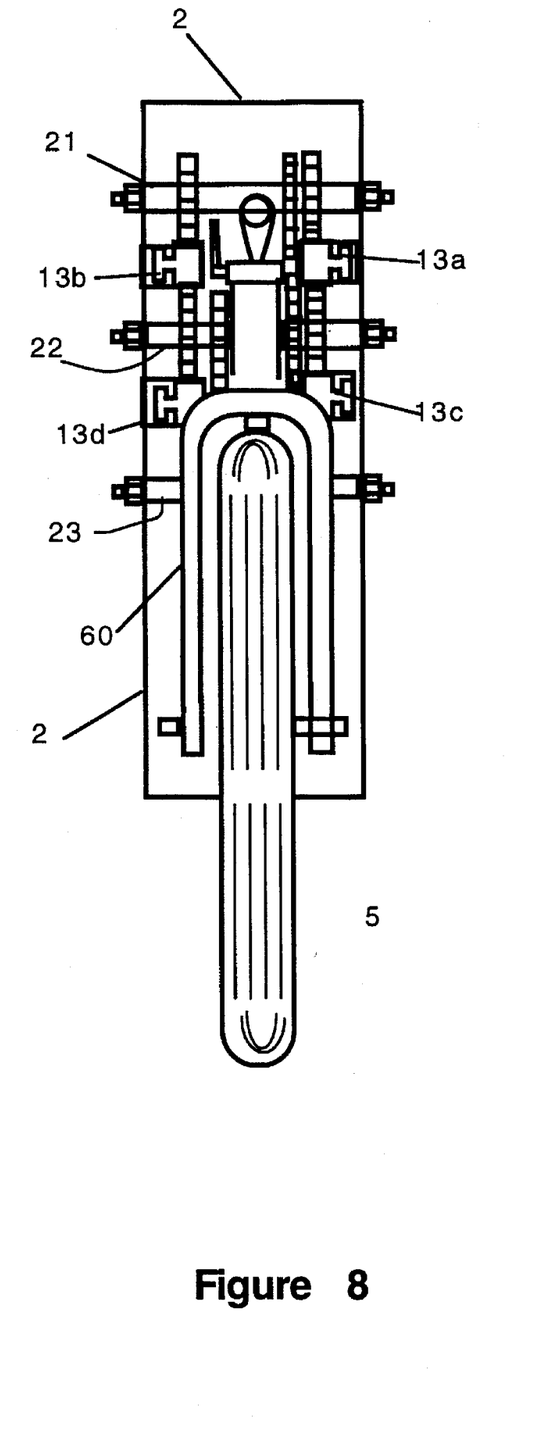
FIG. 8 is a front view of the invention showing one front wheel.
Figure 9:
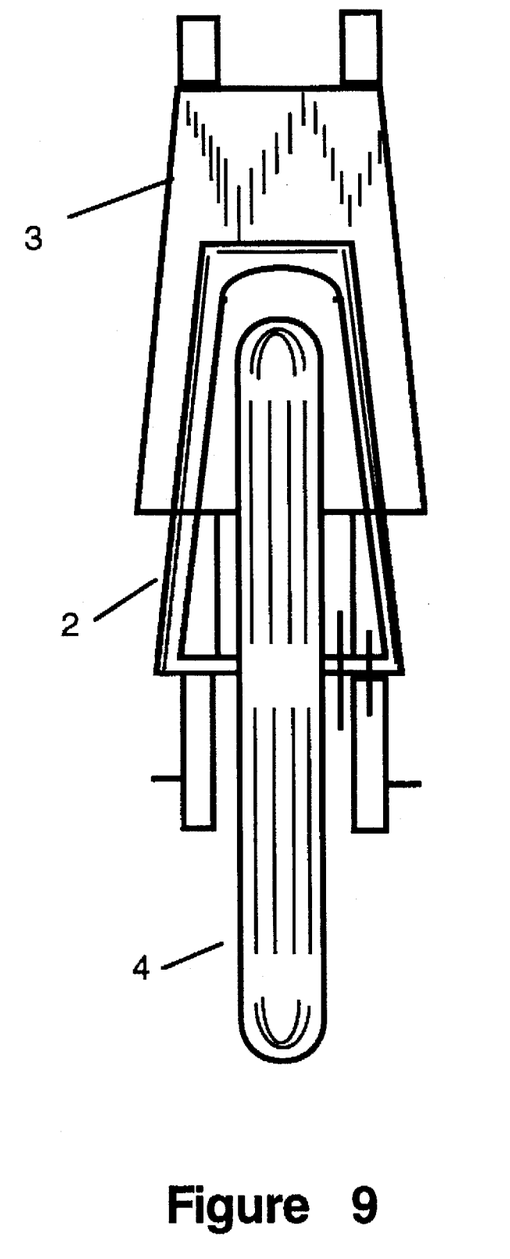
FIG. 9 is a rear view of the invention showing one rear wheel.

Referring now to FIGS. 5 through 7, details of the operation are shown. The racks 13a, 13b, 13c, and 13d are ratcheted to engage the gears 20a, b, and c and 21a, b, and c in one direction only. This allows the gears to be turned in the same direction at all times (see the arrows in the figures). Thus, FIG. 5 shows the device in the neutral position, where the racks 13a, 13b, 13c, and 13d are in the center of a stroke, or the device is at rest. FIG. 6 shows tile mechanism when the arm portion of lever 6 is pulled back and the foot portion is pushed forward. Note again that only one lever 6 is shown. The second lever 7, is manipulated in the opposite manner as the lever 6 shown. The action is the same as that of the lever 6 shown, but the gearing is opposite to that described.

As the hand lever 6 is pulled back, the upper rack 13a is also pulled back. The teeth 14 engage the upper gear 20a causing it to turn in the direction shown. The lower teeth 14 of this rack 13a are ratcheted and do not affect the center gear 20b. At the same time, the foot portion of lever 6 is being pushed forward. This also pushes the lower rack 13c forward. The upper teeth 14 on this rack 13c ratchet over the center gear 20b as well (note the center gear 20b is turned because it is attached to the center shaft 23, which is turned by the opposite stroke of the lever 7 on the other side). The lower teeth 14 on the lower rack 13c engage the lower gear 20c and cause it to turn in the direction shown.

FIG. 7 shows the operation in the reverse portion of the stroke. Here, the arm portion of lever 6 is pushed forward, pushing the upper rack 13a forward. The upper teeth 14 on the upper rack 13a now ratchet against the upper gear 20a and the lower teeth 14 of the upper rack 13a engage the center gear 20b. At the same time, the foot portion of lever 6 is being pulled back. As the foot portion of lever 6 is pulled back, the lower rack 13c is also pulled back. The upper teeth 14 on the lower rack 13c then engage the center gear 20b, causing it to turn in the direction shown. The lower teeth 14 on the lower rack 13c ratchet against the lower gear and do not engage it. In this way, the gearing systems on both sides of the device turn to the maximum advantage with each stroke.

As mentioned above, the lever 7 and the associated racks and gears for the lever 7 are operating in the opposite manner to the components described above. Thus, when rack 13a is pushing forward, rack 13c is being pulled back. In this way, the power of each stroke is multiplied, thereby building and maintaining high speeds with a minimum of sustained effort. This advantage is significant to enable ordinary people to cover significant distances and high speed without exerting extreme amounts of energy.

As discussed above and as shown in FIGS. 5–7, the racks 13a, 13b, 13c, and 13d are connected to rotating arms 16 as shown. These arms 16 are used to a smooth reciprocating motion of the racks 13a, 13b, 13c, and 13d. The arms 16 simply rotate with the operational cycles of the racks. As an alternative, springs may be used to smooth the movement of the racks 13a, 13b, 13c, and 13d. Springs (not shown), however, increase the force needed to operate the vehicle, thereby slightly reducing its performance.

FIGS. 1, 2, 8 and 9 show a typical frame structure 2 for the device. This frame structure 2 shown is not the only frame that can be used. The preferred embodiment uses one front wheel however, the device can be used with two front wheels, with the appropriate changes to the free 2 and controls.

Steering is accomplished through the two levers 6 and 7, which are designed to pivot left or right to steer the cycle 1. The pivot block 8 is attached to a steering shaft 70, which is attached to the forks 60. Any other steering method common to the art that is compatible with the operating mechanism 11 may also be used. For example, a system that utilizes cables attached to the forks 60 can be used. Similarly braking can be achieved through standard bicycle brake systems such as a rear disk brake that is operated by cables attached to levers 6 and 7.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A velocipede comprising:
   a) a frame;
   b) a drive wheel, rotatably mounted to said frame;
   c) a seat, fixedly attached to said frame;
   d) at least one front wheel, steerably attached to said frame;
   e) a first hand-foot lever, pivotably attached to said frame;
   f) a second hand-foot lever, pivotably attached to said frame;
   g) an operating mechanism, being operably attached to said first hand-foot lever, and including a configuration including:
      i) an upper rack, having an upper set of teeth and a lower set of teeth, wherein both sets of teeth are ratchetable in one direction;
      ii) a lower rack, having an upper set of teeth and a lower set of teeth, wherein both sets of teeth are ratchetable in one direction;
      iii) an upper gear, rotatably engaged with the upper set of teeth on said upper rack;
      iv) a central gear, rotatably engaged with the upper set of teeth on said lower rack and said lower set of teeth on said upper rack;
      v) a lower gear, rotatably engaged with the lower set of teeth on said lower rack;
   h) means for transferring rotational energy from said upper, lower and central gears to a common drive shaft; and
   i) means for transferring rotational energy from said common drive shaft to said drive wheel.

2. The velocipede of claim 1 wherein said first hand-foot lever, and said second hand-foot lever are disposed on opposite sides of said frame.

3. The velocipede of claim 1 wherein the operating mechanism is a first operating mechanism, said second hand-foot lever is operably attached to a second operating mechanism, having the same configuration as the first operating mechanism, said first and second operating mechanisms being attached to a set of common shafts.

4. The velocipede of claim 1 wherein the means for transferring rotational energy from said upper, lower, and central gears to a common drive shaft comprise:
   a) an upper shaft, fixedly attached to said upper gear;
   b) a lower shaft, fixedly attached to said lower gear;
   c) a central shaft, fixedly attached to said central gear, whereby said upper, lower and central shafts are rotatably attached to said frame;
   d) an upper transfer sprocket, fixedly attached to said upper shaft;
   e) a first center sprocket, fixedly attached to said central shaft;
   f) a lower transfer sprocket, fixedly attached to said lower shaft;
   g) a second center sprocket, fixedly attached to said central shaft;
   h) a first chain operatively connecting said upper transfer sprocket and said first center sprocket; and
   i) a second chain operatively connecting said lower transfer sprocket and said second center sprocket.

5. The velocipede of claim 4 wherein the means for transferring rotational energy from said common drive shaft to said drive wheel comprises:
   a) a third sprocket, fixedly attached to said central shaft;
   b) a drive sprocket, rotatably attached to said frame; and
   c) a third chain operatively connecting said third sprocket and said drive sprocket.

6. A velocipede comprising:
   a) a frame;
   b) a drive wheel, rotatably mounted to said frame;
   c) a seat, fixedly attached to said frame;
   d) at least one front wheel, steerably attached to said frame;
   e) a first hand-foot lever, pivotably attached to said frame;
   f) a second hand-foot lever, pivotably attached to said frame,
   wherein said first and second hand-foot levers are disposed on opposite sides of said frame;
   g) a first operating mechanism, being operably attached to said first hand-foot lever, and including:
      i) an upper rack, having an upper set of teeth and a lower set of teeth, wherein both sets of teeth are ratchetable in one direction;
      ii) a lower rack, having an upper set of teeth and a lower set of teeth, wherein both sets of teeth are ratchetable in one direction;
      iii) an upper gear, rotatably engaged with the upper set of teeth on said upper rack;

iv) a central gear, rotatably engaged with the upper set of teeth on said lower rack and said lower set of teeth on said upper rack, v) a lower gear, rotatably engaged with the lower set of teeth on said lower rack;

h) a second operating mechanism being operably connected to said second hand-foot lever, and having the same configuration as said first operating mechanism;

i) an upper shaft, fixedly attached to said upper gear;

j) a lower shaft, fixedly attached to said lower gear;

k) a central shaft, fixedly attached to said central gear, whereby said upper, lower and central shafts are rotatably attached to said frame;

l) an upper transfer sprocket, fixedly attached to said upper shaft;

m) a first center sprocket, fixedly attached to said central shaft;

n) a lower transfer sprocket, fixedly attached to said lower shaft;

o) a second center sprocket, fixedly attached to said central shaft;

p) a first chain operatively connecting said upper transfer sprocket and said first center sprocket; and q) a second chain operatively connecting said lower transfer sprocket and said second center sprocket means for transferring rotational energy from said upper, lower, and central gears to a common drive shaft;

r) a third sprocket, fixedly attached to said central shaft;

s) a drive sprocket, rotatably attached to said frame;

t) a third chain operatively connecting said third sprocket and said drive sprocket; and u) means for connecting said drive sprocket to said drive wheel.

7. The velocipede of claim 6 wherein the means for connecting said drive sprocket to said drive wheel comprise:

a) a rear sprocket, fixedly attached to said drive wheel; and b) a fourth chain operably connecting said rear sprocket and said drive sprocket.

8. The velocipede of claim 7 wherein the means for connecting said drive sprocket to said drive wheel further comprise a means for adjusting the speed of said rear sprocket.

9. The velocipede of claim 8 wherein the means for adjusting a the speed of said rear sprocket comprise a set of sized gears, attached to said rear sprocket, said sized gears being in operable connection to said fourth chain and a means for operably moving said fourth chain over the range of sized gears to adjust the speed of the velocipede as desired.

10. The method of operating a velocipede having a frame; a drive wheel; rotatably mounted to said frame, a seat, fixedly attached to said frame; at least one front wheel, steerably attached to said frame, a first hand-foot lever, pivotably attached to said frame, a second hand-foot lever, pivotably attached to said frame, a first operating mechanism, being operably attached to said first hand-foot lever, and including:

i) an upper rack, having an upper set of teeth and a lower set of teeth, wherein both sets of teeth are ratchetable in one direction;

ii) a lower rack, having an upper set of teeth and a lower set of teeth, wherein both sets of teeth are ratchetable in one direction;

iii) an upper gear, rotatably engaged with the upper set of teeth on said upper rack;

iv) a central gear, rotatably engaged with the upper set of teeth on said lower rack and said lower set of teeth on said upper rack;

v) a lower gear rotatably engaged with the lower set of teeth on said lower rack, a second operating mechanism, operably attached to said second hand-foot lever, being of the same configuration as said first operating mechanism, a means for transferring rotational energy from said upper, lower and said central gears to a common drive shaft, and a means for transferring said rotational energy from said common drive shaft to said drive wheel comprising the steps of:

a) pushing said first hand-foot lever forward;

b) simultaneously pulling said second hand-foot lever rearward;

c) repeating steps a and b in a continuous motion, thereby causing said first operating mechanism and said second operating mechanism to produce forward movement of said velocipede as desired.

* * * * *